March 3, 1931. C. Y. KNIGHT 1,794,715
VIBRATION BALANCING MECHANISM
Filed March 26, 1925    2 Sheets-Sheet 1
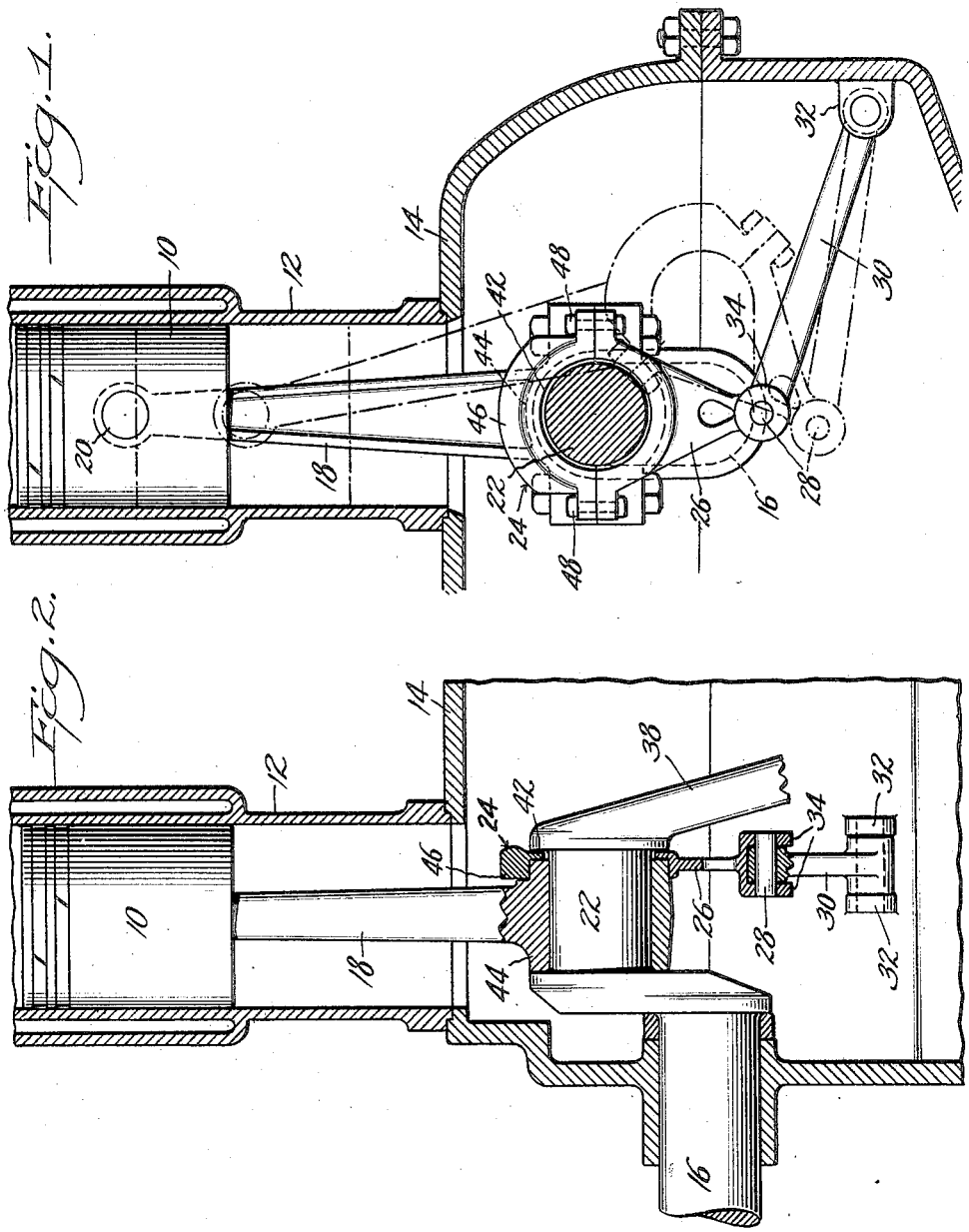
WITNESS
Oliver W. Holmes
INVENTOR
Charles Y. Knight
BY
Chester W Bramelton
ATTORNEY

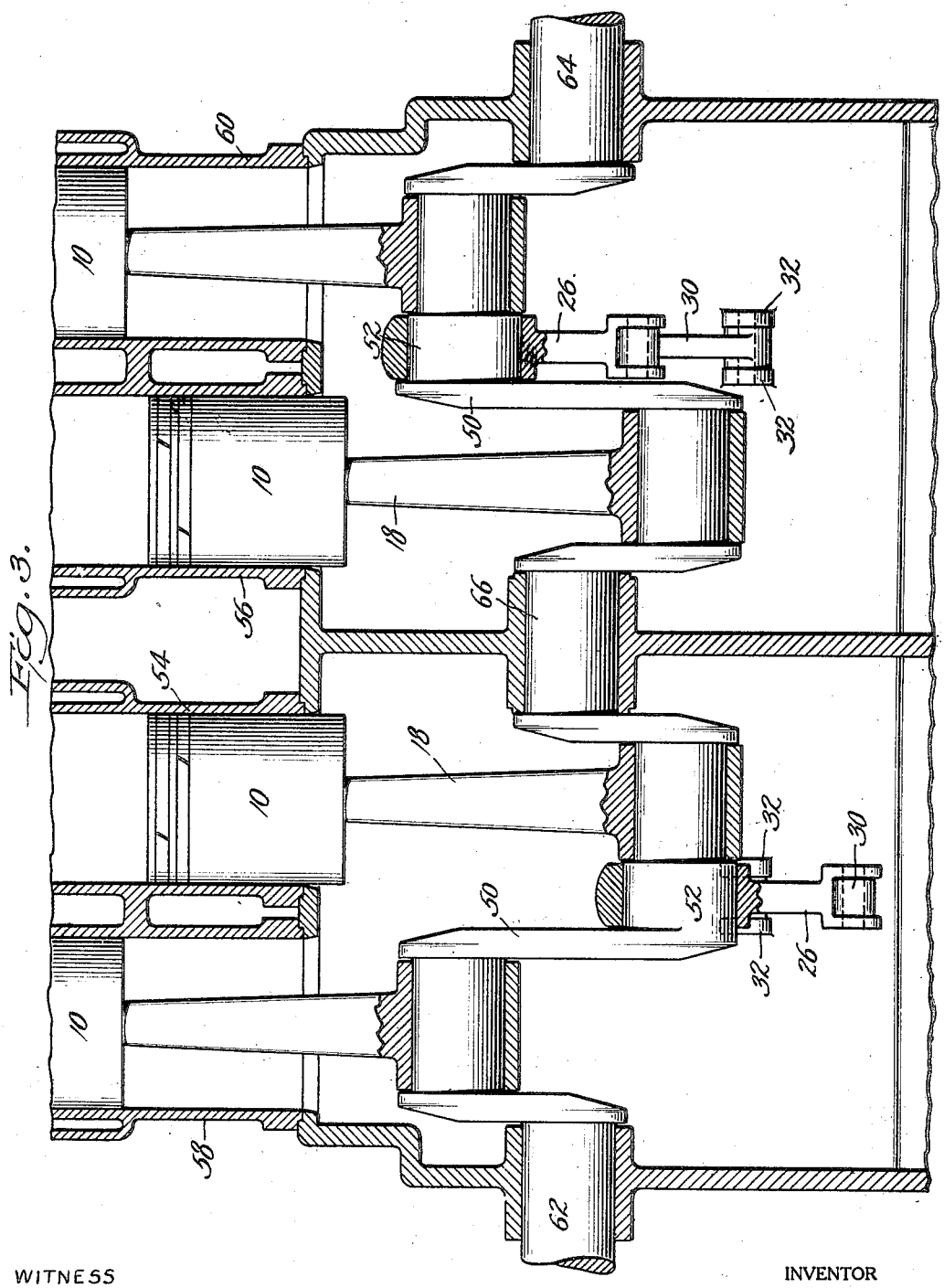

Patented Mar. 3, 1931

1,794,715

UNITED STATES PATENT OFFICE

CHARLES Y. KNIGHT, OF PASADENA, CALIFORNIA, ASSIGNOR TO KNIGHT & KILBOURNE DEVELOPMENT CO., OF CHICAGO, ILLINOIS, A CORPORATION OF ILLINOIS

VIBRATION-BALANCING MECHANISM

Application filed March 26, 1925. Serial No. 18,460.

This invention relates to apparatus for balancing the vibrations of reciprocating engines or motors, and, more particularly, to a means for balancing the secondary vibrations of internal combustion engines.

In the construction of reciprocating motors or engines, the masses of rotating and reciprocating elements are so balanced, particularly in engines of multiple cylinders, that a mass moving in one direction is counterbalanced by a substantially equal mass moving in the opposite direction, in order to lessen or eliminate the vibrations caused by the reversal or changes of movement of the moving parts. Thus, in the case of a four-cycle, four-cylinder engine, the pistons are arranged in balanced pairs in which the crank pins and connecting webs are placed on opposite sides of the axis of rotation of the crank shaft and thus counterbalance each other. Certain secondary vibrations, however, remain as they are not due to unbalanced weights but to irregularities in movement caused by the differing relations of speed between pistons, connecting rod and crank shaft even though the masses of these elements may be perfectly balanced. These changing speed relations are caused by the fact that during the early part of the downstroke or outstroke of the piston, the speed of the piston is increased relatively to the speed of the crank shaft by the increasing angularity of the connecting rod which, in effect, shortens the linear or center line distance of the moving piston to the fixed crank shaft axis and that during the latter half of the stroke the speed of the piston is correspondingly decreased as the angularity decreases and the connecting rod comes into alignment with the axis of the piston. With a constant speed of crank shaft rotation, therefore, the speed of the piston is considerably greater during the first part of the outstroke or the first ninety degrees of the crank shaft rotation than it is during the second half or second ninety degrees of crank shaft rotation. The acceleration and increase in momentum of the piston and its associated elements are therefore greater during the first half of the stroke than during the second half and this lack of balance gives rise to secondary vibrations not compensated by balancing weights or masses.

An object of my present invention is to provide a balancing means for the secondary vibrations in reciprocating motors of the type indicated above.

Another object of the invention is to provide a balancing means for vibrations of the type indicated above in which the excess thrust or force at one part of the stroke is stored and later imparted to the engine in a later stage.

A further object of the invention is to provide a balancing means of the type indicated in which side thrusts or torques on the engine due to secondary vibrational forces are opposed and eliminated.

A still further object of the invention is to provide a crank shaft particularly suited to the mounting of means for counterbalancing secondary vibrations and an improved mounting for the balancing means on the crank shaft.

With these and other objects in view, which will be apparent from the following description, the invention comprises the apparatus described and set forth in the following specification and claims.

The various features of the invention are illustrated in the accompanying drawings, in which:

Figure 1 is a vertical sectional view, taken at right angles to the axis of the crank shaft of an engine and balancing apparatus embodying a form of the invention;

Figure 2 is a vertical, sectional view of the engine and balancing apparatus taken at right angles to that of Figure 1 and substantially axially of the crank shaft and pistons, and Figure 3 is a vertical, sectional, longitudinal view of a crank shaft and balancing mechanism mounting embodying a preferred form of the invention.

In my present invention, the excess thrust of the reciprocating elements in the first part of the outstroke is absorbed and balanced by a balance or weight to which the thrust of the connecting rod is imparted gradually and approximately in proportion to the force or speed of the thrust. The balancing weight is given a momentum or rotation which continues as the stroke is completed and the momentum thus given to this weight is returned to the crank shaft in the early part of the return or up stroke as the rotational movement is checked or opposed through the inertia of the reciprocating elements. This balancing element opposes a momentum the reverse of that of the piston and connecting rod and balances or compensates the excess momentum of the piston and associated parts by changes of speed proportional to and reverse to that of the piston, being given a proportionately greater speed and acceleration in the second half of the down stroke when the momentum of the piston and associated parts must be most rapidly checked. The balancing action is thus brought about by increasing the speed of the balancing means to compensate for the lack of balance and deficiency in speed of the reciprocating elements in the second half of the outstroke relative to the speed in the first half. The unevenness caused by the changing angularity of the connecting rod may thus be balanced. As the balancing action is brought about largely by changes of speed rather than by balancing masses, the balancing apparatus does not add materially to the weight of the engine.

As the varying acceleration of the engine elements is balanced by the varying acceleration of a uniform mass, this balancing acceleration is directed in the present invention, to a movement of rotation and is so arranged that the momentum absorbed from the engine elements in one part of its cycle is stored and returned in another portion or cycle with very slight diminution. In directing the momentum in a rotational direction, the thrusts on fixed centers are so directed as to oppose the side thrusts and torques imposed on the engine by the unbalanced vibrations or momentums.

Referring more particularly to the accompanying drawings, the invention is illustrated as applied to an internal combustion engine having pistons 10 reciprocating in cylinders 12 supported on an engine or crank shaft casing 14, and connected to a crank shaft 16 by means of connecting rods 18, the inner or smaller ends of which encircle wrist pins 20 in the pistons and the outer or larger ends of which encircle the crank pin portions 22 of the crank shaft. The lower or crank pin end of the connecting rods may be of the usual or standard split construction as illustrated in the drawings.

The balancing apparatus may be mounted directly on the crank pins of the crank shaft as indicated in Figure 3 or on the crank pin end of the connecting rod and thus indirectly on the crank shaft as indicated in Figures 1 and 2. One balancing apparatus will suffice for each two cylinders of the engine, a four-cylinder engine therefore having two balancing apparatuses.

The compensating momentum of the balancing apparatus is obtained by the changes in speed of a mass 24 mounted directly or indirectly on the crank shaft 16 in the same angular position to the axis of the crank shaft as the crank pin or crank pins of the piston or pistons to be compensated. The rotation of the crank shaft imparts a movement to the mass 24 which is transformed into a movement of rotation with an acceleration compensating the deceleration of the pistons and connecting rods and brought into action gradually and proportionately to the deceleration of the piston and connecting rod.

For this purpose, the mass 24 is connected by means of a rod 26 projecting diametrically opposite therefrom to a pin 28 which serves as a center of rotation for the mass. The pin 28 is permitted to move upwardly and downwardly with the rotation of the crank shaft but is held to approximately an upward and downward movement by means of a link 30 which is connected at one end to an ear 32 on the inner surface of the crank shaft casing 14 and at its other end enters between bifurcated ends 34 of the rod 26 to encircle the pin 28.

It will be noted that the speed or movement of the pin 28 and rod 26 is the reverse of that of the piston 10 and connecting rod 18, and that the movement of the pin 28, and the other elements of the balancing mechanism, which are connected to it, is lessened by the decreasing vertical distance of the pin from the center of the crank pin 22 during the first half of the stroke and is proportionately increased during the second half, due to the tilting and straightening movements of the rod 26 and that this effect is greatly increased by the shortness of the rod 26. The magnified effect of the short rod 26 enables a much smaller mass 24 to be employed as the effect of this mass is thus greatly increased and is most effectively applied to the absorption of unbalanced momentums due to speed changes. By appropriate proportioning of the rod 26 and positioning of the mass 24, the weight of the mass 24 may be so small as to not add appreciably to the weight of the engine.

As the pin 28 is constrained to a fixed and approximately vertical path, and is secured to the mass 24 by a fixed length, the mass 24 is accordingly given a rotational movement relative to the pin 28 as a center as it swings through the second and third quarters of its cycle of each stroke. This rotational movement is zero at the beginning of the second quarter of rotation and increases to a maximum at the end of the second quarter, when the crank pin 22 is at a dead center and the rotational force exerted on it is a minimum or zero. Accordingly, the momentum imparted to and stored in the balancing apparatus during the first quarter is given up during the third quarter, when the rotational force on the crank shaft decreases to zero, and is imparted to the crank pin on the return stroke. During the upper part of the rotation of the crank shaft, or during the fourth and first quarters of rotation, the movement of the weight 24 is lessened by the angular effects, which are opposite to those of the second and third quarters. Thus, the angular effects of the rod 26 are opposite and proportional to those of the connecting rod 18 and compensate for the varying momentums of the engine.

By properly positioning the mass 24, the center of gravity or center of inertia of its mass may be so positioned as to obtain a leverage effect on the crank pin that multiplies the effect of the mass and thus enables a smaller mass to be used to accomplish a desired or required balancing effect. This also imposes a thrust on the pin 28 which forms a point of the lever that is transmitted through the link 30 to the crank casing 14. This thrust may be so directed and utilized as to balance the turning thrust or torque transmitted through the connecting rod 18 to the piston 10 and resolved at right angles to the line of reciprocation of the piston. In this manner, the unbalanced side thrusts and torques on the engine cylinders may be absorbed and balanced.

The point at which the ear 32 is positioned may be selected to suit the needs and design of a particular engine to which the apparatus is applied, that shown in the drawings being merely by way of illustration.

The balancing apparatus may be mounted on the crank shaft in any suitable manner. When it is to be applied to a crank shaft of the usual construction, as indicated in Figs. 1 and 2, in which slanting webs 38 are used between the crank pins 22 and center bearings and in which there is no space free on the crank pins, the weight 24 may be rotatably mounted on the end of the connecting rod 18. In this case, the weight 24 and connecting rod 26 are provided with a circular opening having a circular flange 42 fitted into a circular groove in the encircling portion 44 of the connecting rod 18 and with a ring 46 encircling the portion 44. The encircling portions of the weight 24 and rod 26 are made in the form of a split ring secured together by means of bolts 48.

In the preferred form of mounting shown in Fig. 3, however, the crank shaft is made with straight webs 50, providing a space 52 on the crankpins on which the balancing apparatus is to be mounted. In the embodiment illustrated in Fig. 3, the invention is shown as applied to a four-cycle four-cylinder engine. In this case, two cylinders 54 and 56 have the same angular relation and but a single balancing apparatus is required while the two outer cylinders 58 and 60 have the same angular relations but the reverse of that of cylinders 54 and 56 and, accordingly a second balancing apparatus is required. The shaft 16 is, of course, provided with appropriate end bearings 62 and 64 and with one or more intermediate bearings 66 according to the requirements of the engine.

Through the above invention, therefore, the secondary vibrations, due to unbalanced movements of masses which may be balanced, are balanced and absorbed. Moreover, the momentum given to the balancing apparatus in one portion of its cycle is stored and given back to the engine in a succeeding part of the cycle and is also utilized to balance vibrational twisting forces or torques set up in the engine.

As changes of construction could be made within the scope of my invention, it is desired that all matter contained in the above description or shown in the accompanying drawings shall be interpreted as illustrative and not in a limiting sense.

Having described my invention, what I claim and desire to secure by Letters Patent is:—

1. Apparatus of the type described which comprises a piston, a crank shaft, a connecting rod connecting said piston to said crank shaft, a movable mass supported on said crank shaft, and means for giving said mass an acceleration reverse to and substantially inversely proportional to the movement of said piston and connecting rod to absorb excess momentum of said piston rod and associated elements on the second half of the out-stroke.

2. Apparatus of the type described which comprises a piston, a crank shaft, a connecting rod connecting said piston to said crank shaft, a movable mass supported on said crank shaft, and means for giving said mass rotational acceleration reverse to and substantially inversely proportional to the movement of said piston and connecting rod to absorb excess momentum of said piston rod and associated elements on the second half of the out-stroke.

3. Apparatus of the type described which comprises a piston, a crank shaft, a connecting rod connecting said piston to said crank shaft, a movable mass acting on and supported by said crank shaft, and means for giving said mass rotational acceleration reverse to and substantially inversely proportional to the movement of said piston and connecting rod to absorb excess momentum on the second half of the outstroke.

4. Apparatus of the type described which comprises a piston, a crank shaft, a connecting rod connecting said piston to said crank shaft, a mass balanced on said crank shaft and acting on a holding center to receive a rotational acceleration reverse to and substantially inversely proportional to that of said piston and associated parts and means for transmitting the thrust on said holding center to balance the side thrust on the pistons.

5. Apparatus of the type described which comprises a reciprocating piston, a crank shaft, a connecting rod between said piston and said crank shaft, a mass having a portion extending on the opposite side of said crank shaft from said piston and connected to said crank shaft at approximately the same angle from the axis of the crank shaft as said connecting rod and means for causing the extended end of said mass to travel in an approximately straight path of reciprocation, said mass being the sole means of compensating for the unbalanced forces set up by the piston and connecting rod.

6. Apparatus of the type described which comprises a reciprocating piston, a crank shaft, a connecting rod between said piston and said crank shaft, a shorter rod on the opposite side of said crank shaft from said piston and connected to said crank shaft at approximately the same angle to the axis of the crank shaft as said connecting rod and having a mass with a center of gravity different from its center of connection with the crank shaft and means for causing the free end of said shorter rod to travel in an approximately straight path of reciprocation, said rod being the sole means of compensating for the unbalanced forces set up by the piston and connecting rod.

7. Apparatus of the type described which comprises a reciprocating piston, a crank shaft, a connecting rod between said piston and said crank shaft, a shorter rod on the opposite side of said crank shaft from said piston and connected to said crank shaft at approximately the same angle to the axis of the crank shaft as said connecting rod and having a mass with a center of gravity different from its center of connection to the crank shaft and a swinging link connecting the free end of said shorter rod to the casing of said engine, said rod being the sole means of compensating for the unbalanced forces set up by the piston and connecting rod.

8. Apparatus of the type described which comprises an engine having a reciprocating piston, a crank shaft, a connecting rod between said piston and said crank shaft, a short weighted rod connected to said crank shaft in the same angular position thereon as said connecting rod and extending on the opposite side of said crank shaft and a link connecting the free end of said rod to the engine casing, the connections of said rod to said crank shaft and link being so related to the mass of said rod as to impart a thrust on said engine casing to balance the torque thrust of the connecting rod on said piston.

9. Apparatus of the type described which comprises an engine having a reciprocating piston, a crank shaft, a connecting rod between said piston and said crank shaft, a mass supported on said crank shaft, and means for connecting said mass to the casing of said engine to receive an acceleration substantially inversely proportional to that of the piston as said crank shaft rotates uniformly, and to impart a corresponding force to the engine casing.

10. Apparatus of the type described which comprises an engine having a reciprocating piston, a crank shaft and a connecting rod between said piston and said crank shaft, a mass secured on a compensating rod and mounted on said crank shaft with the same angularity as said connecting rod and means connecting said compensating rod to the casing of said engine to give said mass an acceleration substantially inversely proportional to that of said piston and to impart a force to said engine casing.

11. Apparatus of the type described which comprises an engine having a crank shaft and a pair of pistons connected thereto with the same angular relations to the axis of the crank shaft, a compensating mass connected to the crank shaft at the same angle as said piston connections and extending on the opposite side of said crank shaft and means for causing the extended end of said compensating mass to travel in a substantially straight line, said mass being the sole means of compensating for the unbalanced forces set up by the pistons and connecting rods.

12. Apparatus of the type described which comprises an engine having a piston, a crank shaft and a connecting rod connecting said piston to said crank shaft and having an enlarged bearing end on said crank shaft, and a weighted compensating rod revolvably mounted on said enlarged bearing end of said connecting rod, and a link connecting the free end of said compensating rod to the casing of said engine.

13. In an apparatus of the class described comprising a crank shaft having off-set portions, reciprocable means for rotating said crank shaft, a vibration compensating rod revolvably mounted on the off-set portion of the crank shaft, said rod having a weighted portion adjacent the crank shaft, and a link connecting the free end of said compensating rod to a fixed support adjacent the shaft.

14. In an apparatus of the class described, the combination of a crank shaft having an off-set portion, means connected to said off-set portion for rotating the shaft, a movable mass pivotally connected to the crank off-set portion, and means for giving to said movable mass an acceleration reverse to and substantially inversely proportional to movement of such rotating means whereby undesirable vibrations thereof are absorbed.

15. In an apparatus of the class described, comprising a crank shaft and two pistons connected thereto at an angle of substantially 180°, a mass eccentrically connected to said crank shaft, means to limit the rotation of said mass upon said shaft whereby said mass is adapted to have reciprocating movement and partial rotating movement upon the rotation of said shaft, said mass being such that the momentum set up in said mass during one-half of the rotations of said crank shaft will be equal to the difference between the momentum set up in one piston and connecting rod during the first half of the outer stroke thereof and the momentum set up in the other piston and connecting rod during the first half of the inner stroke thereof.

In testimony whereof, I affix my signature.

CHARLES Y. KNIGHT.